(12) United States Patent
Meyers

(10) Patent No.: US 6,469,843 B2
(45) Date of Patent: Oct. 22, 2002

(54) OPTICAL BENCH ASSEMBLY AND FABRICATION METHOD

(75) Inventor: Mark M. Meyers, Allentown, PA (US)

(73) Assignee: Agere Systems Guardian Corp., Orlando, FL (US)

( * ) Notice: Subject to any disclaimer, the term of this patent is extended or adjusted under 35 U.S.C. 154(b) by 0 days.

(21) Appl. No.: 09/737,027

(22) Filed: Dec. 14, 2000

(65) Prior Publication Data

US 2002/0135884 A1 Sep. 26, 2002

(51) Int. Cl.[7] ............................. G02B 7/02; G02B 6/32
(52) U.S. Cl. ......................................... 359/811; 385/33
(58) Field of Search ........................... 359/16, 19, 565, 359/642, 811, 819, 823; 385/33, 34, 35, 93

(56) References Cited

U.S. PATENT DOCUMENTS

| | | | | |
|---|---|---|---|---|
| 4,983,009 A | * | 1/1991 | Musk | 385/35 |
| 5,066,089 A | * | 11/1991 | Greil et al. | 385/35 |
| 5,229,883 A | * | 7/1993 | Jackson et al. | 359/569 |
| 5,684,901 A | * | 11/1997 | Gaebe | 385/33 |
| 6,091,756 A | * | 7/2000 | Bylsma | 372/101 |
| 6,157,502 A | * | 12/2000 | Kathman | 359/819 |
| 6,215,925 B1 | * | 4/2001 | Kaneyama | 385/35 |
| 6,252,725 B1 | * | 6/2001 | Tran et al. | 359/811 |

OTHER PUBLICATIONS

Meyers, Mark M., entitled "Diffractive optics at Eastman Kodak", SPIE vol. 2689, pp. 228–254, Aug. 1996.

* cited by examiner

Primary Examiner—Georgia Epps
Assistant Examiner—Saeed Seyrafi

(57) ABSTRACT

An optical lens for use with an optical bench. The lens has a diffractive element which provides an angular offset to radiation incident on the lens. The offset substantially compensates for an undesirable focal point location caused by a variance between an integral component position on the bench and a desired position. The lens is particularly useful for an integral component position dictated by the bench crystal structure. In an illustrative embodiment an aspheric diffractive element deflects incident radiation by an amount in the range of about 8° to about 12°. Further disclosed is a method of compensation for variance between an integral component position on a bench and a desired position. Still further disclosed are an optical bench, a method for fabricating an optical bench and a semiconductor device.

18 Claims, 3 Drawing Sheets

OPTICAL BENCH ASSEMBLY AND FABRICATION METHOD

FIELD OF THE INVENTION

The invention relates to receivers for optical telecommunications applications, and more particularly to silicon optical benches used therein.

BACKGROUND OF THE INVENTION

Silicon optical benches typically comprise a single crystal semiconductor such as silicon as a base material upon or within which an optoelectronic device subassembly is constructed. Silicon optical benches may be used to fabricate receiver modules for optical telecommunications. As depicted in FIG. 1 a receiver module may include a photodetector 102 and a mirror 104 to direct incident radiation from an optical fiber 106 onto the photodetector active region 108. Typically, the incident light is focused onto mirror 104 by a coupling lens 110. The bench facilitates the alignment of light from fiber 106 such that it focuses on mirror 104. Mirrors may be formed directly in the silicon bench by etching along the (1,1,1) plane and coating the resulting exposed face or faces with aluminum or gold. The etched planes for silicon are at an angle of 35.7° to the incident light, which results in a reflection which is 108.6° from the optical axis. The optimum reflection angle, however, for directing incident light onto photodetector active region 108 is typically 90°. Accordingly, light incident on photodetector 102 is at an 18.4° angle relative to the surface normal, and therefore, may miss active region 108.

As shown in FIG. 2, when a lensed photodetector 202 is used, a focus spot 204 is formed away from the center of the active photodetector region 206. In this configuration 60% to 75% of the focused light may miss active region 206. This may lead to decreased coupling efficiency and lower overall signal levels on the receiver.

A lens may be formed on the photodetector surface to concentrate the light into a smaller area, and thereby increase the coupling efficiency. The disadvantage of this approach is that some or all of the light is likely to be incident outside of the active area of the photodetector when a mirror etched on the silicon bench is used.

Increasing the active region of the photodetector may compensate for alignment problems caused by mirrors etched in the silicon (1,1,1) plane. This, however, has the undesirable effect of increasing device capacitance, and therefore, reducing the usable bandwidth of the device due to the increase response time constant. This may also lead to a need for larger devices to generate the same photocurrent. As device size increases, fewer devices may be fabricated from a single wafer, thereby increasing the cost per device.

Accordingly, there is a need to accurately focus incident radiation on the active region of a photodetector in an optical subassembly bench when a mirror position in the subassembly is dictated by the crystal structure of the bench material.

SUMMARY OF THE INVENTION

An optical lens for use with an optical bench is disclosed. The lens consists of a diffractive element which provides an angular offset to radiation incident on the lens while allowing it to be focused to a point. The angular offset substantially compensates for an undesirable focal point location caused by a variance between an integral component position on the bench and a desired position. The lens is particularly useful wherein an integral component position is dictated by the bench crystal structure. In an illustrative embodiment the diffractive element is aspheric and deflects incident radiation by an amount in the range of about 8° to about 12° to compensate for the focal point location produced by an integral component positioned on a silicon (1,1,1) plane.

Further disclosed is a method of compensation for variance between an integral component position on a bench and a desired position. Still further disclosed are an optical bench. a method for fabricating an optical bench and a semiconductor device.

DESCRIPTION OF THE DRAWINGS

The invention is best understood from the following detailed description when read with the accompanying drawings.

DETAILED DESCRIPTION OF THE INVENTION

Embodiments of the invention provide a diffractive lens which focuses incident radiation on an active region of a photodetector in an optical assembly bench. The invention is particularly applicable to an optical subassembly wherein a mirror is positioned in the subassembly according to the crystal structure of the bench material and deflects radiation onto a photodetector. The invention allows integral component positions to remain substantially unchanged from conventional configurations which may be dictated by optical bench material crystal structure. This may enable high coupling efficiency to the photodetector to be achieved. For simplicity, embodiments of the invention will be described primarily as they apply to an integral component such as a mirror etched in a silicon bench. Those skilled in the art will understand that the concepts described herein may be applied to other optoelectronic assemblies.

Figure 1:
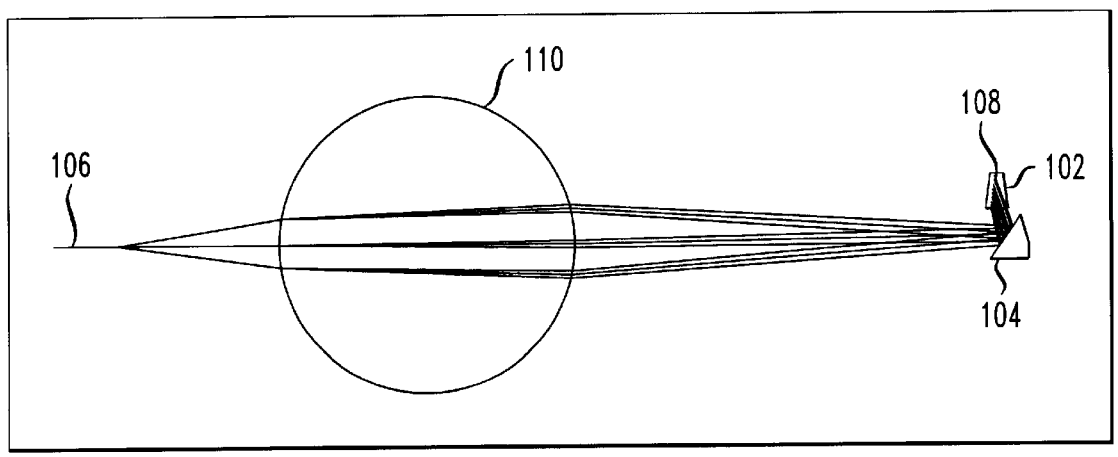
FIG. 1 depicts a prior art optical assembly.
Figure 2:
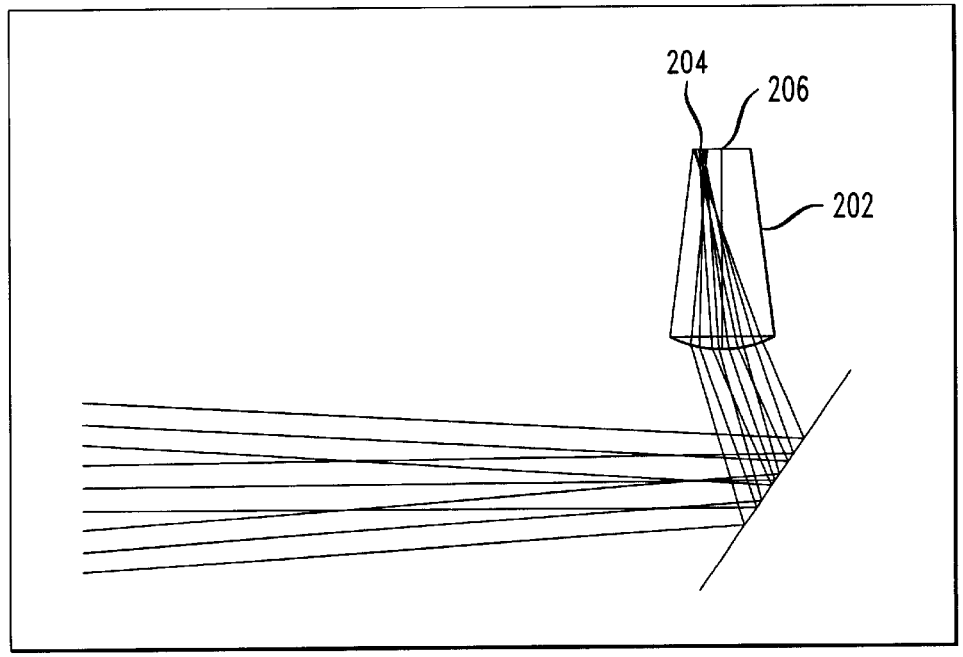
FIG. 2 is an enlargement of the mirror and photodetector of FIG. 1.
Figure 3:
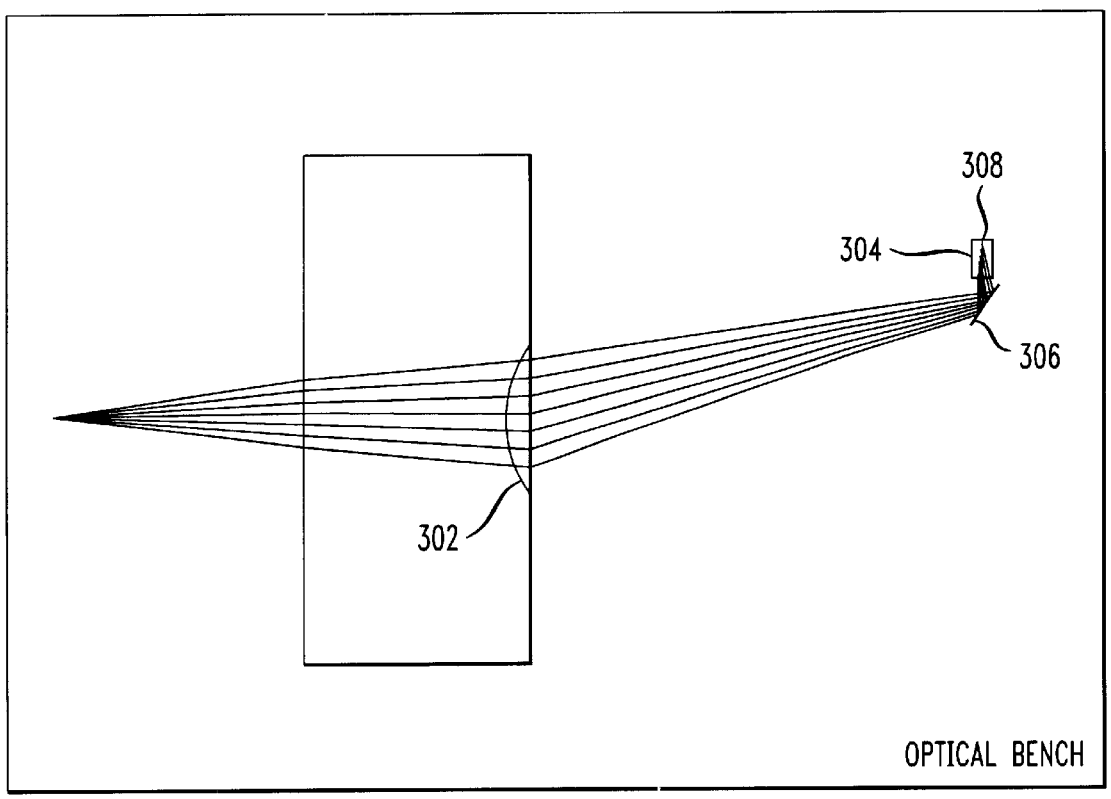
FIG. 3 is an optical assembly according to an illustrative embodiment of the invention.

FIG. 3 depicts an embodiment of the invention comprising a diffractive or decentered refractive aspheric lens 302 to focus and/or deflect incident light at an angle relative to the optical axis of the lens such that it is nearly normally incident on a surface of detector 304 . The lens may deflect radiation reflected by a mirror 306 etched in an optical bench, for example, a mirror etched along the (1,1,1) crystal plane of a silicon optical bench. Diffractive element 302 provides an angular offset to the incident radiation compensating for a discrepancy between a focal point location produced without lens 302 and a desired focal point location. The discrepancy may be caused by a variance between the mirror's angular position on the bench and a desired position. The variance arises primarily because the mirror's angular position is dictated by the crystal structure of the bench. The angular offset allows the radiation to be focused onto an active region 308 of detector 304.

The diffractive lens focuses light emitted from an optical fiber to a relatively small spot on the mirror while also deflecting a central ray at an angle which will bring it nearly normal into the surface of the detector. Because an etched (1,1,1) surface in silicon is formed at an angle of 54.3°, the exact deflection angle relative to the optical axis for bringing the light normal incident to the detector is 9.3 °. This produces the result that would be achieved by a mirror positioned at close to a 45° angle. It is desirable to have the incident light at a small angle relative to the normal so that there is no light reflected back into the fiber. Therefore, the deflection angle is preferably adjusted to be incident at 1°–2° from the normal, which will allow efficient coupling as well as prevent back reflections into the fiber. In an illustrative embodiment the diffractive lens is described by a phase polynomial (in units of radians of phase departure) of the form $$\phi(X,Y) = A_1*(Y,\rho) + A_2*(Y,\rho)^2 + A_3*(X,\rho)^2 + A_4*(Y/\rho)^4 + A_5*(X,\rho)^4 + A_6*(Y/\rho)^6 + A_7*(X/\rho)^6$$

where $\rho = 1.2 =$ normalization radius and

| | | | | |
|---|---|---|---|---|
| $A_1 = 1050.0$ | $A_2 = -3183.16$ | $A_3 = -3137.27$ | $A_4 = -16.02$ | $A_5 = 869.31$ |
| $A_6 = 2418.41$ | $A_7 = -8070.04$ | | | | where the phase polynomial describes the diffractive element's ability to reshape the incident wavefront into the desired converging wavefront which is to be incident on the photodetector. The coefficients are arrived at by optimization of a multi-parameter target matrix. Parameters targeted include for example, spot size, wavefront departures from ideal values, focal length, incident ray angle, spacing and size constraints. The optimization process may be carried out by commercially available programs such as Zemax by Focus Software, Inc. of Tucson Ariz., Code V by Optical Research Associates of Pasadena, Calif., and Oslo 6 by Sinclair Optics of Rochester, N.Y. The "A" values above were generated by a Zemax program. Those skilled in the art will understand that diffractive lenses having other shapes or described by other polynomials may be used, provided that they deflect and focus incident radiation by the desired amount.

Figure 4:
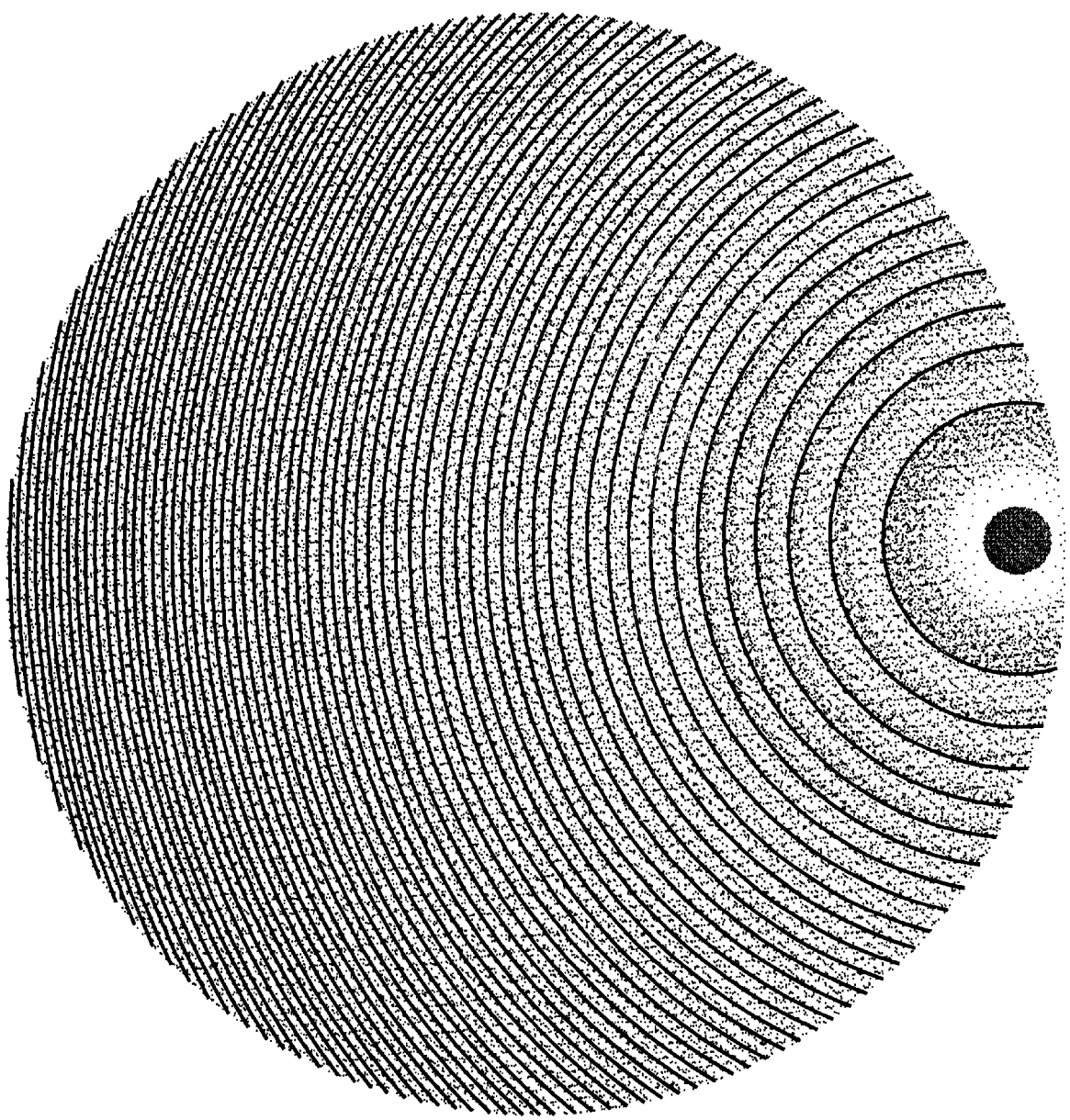
FIG. 4 is a diffractive element according to an illustrative embodiment of the invention.

Diffractive optics use microscopic surface features in a manner similar to a grating with a variable period across the aperture of the lens to deflect light into the desired path. They are similar to the phased Fresnel lens in construction. An illustrative example of a diffractive element for embodiments of the inventive application is depicted in FIG. 4.

In an illustrative embodiment of the invention the low spatial frequency region of the diffractive element is offset from the center of the element to diffract the central ray at an angle relative to the optical axis. FIG. 4 depicts the maximum diffractive fringe height ($\lambda/(n-1)$) as the lightest gray and the minimum fringe height (zero or substrate level) as black.

Advantageously, embodiments of the invention will allow for the coupling of light into a receiver mounted on the surface of the an optical bench with high efficiency. The configuration compensates for the inherent property of a bench material to etch at a particular angle along a particular plane by diffracting the light at an angle relative to the optical axis to focus the incident radiation at a desired location to compensate for a variance between the angle dictated by the material and a desired angle. A similar effect may be accomplished with an off-axis refractive lens.

A broad embodiment of the invention may be described as an optical lens for use with an optical bench comprising a diffractive element wherein the diffractive element provides an angular offset to incident radiation, preferably to the central ray. The angular offset substantially compensates for a discrepancy between a focal point location and a desired focal point location, generally caused by a variance between an integral component position on the bench and an optimum position. Typically, the variance is due to the integral component position being dictated by the bench crystal structure. For example, a silicon optical bench may have an integral mirror component etched therein at an angle of 54.3° along the (1,1,1) crystal plane. A desirable angle for the mirror position may be 45°, for example, to transmit light normally incident on a receiving photodetector. Therefore, the diffractive element would be used to produce an angular offset of approximately 8° to compensate for the non-normally incident radiation. In an illustrative embodiment the lens is aspheric, however, any shape may be used that provides the necessary offset and facilitates any focusing requirements of the lens.

Embodiments of the invention apply to any material bench but are particularly applicable to semiconductor benches because of their current widespread use, with silicon being the most commonly used material. Other examples include, but are not limited to, gallium arsenide, indium phosphide and lithium niobate.

Embodiments of the invention may be applied to any integral component that creates a situation for which angular compensation is useful. Mirrors positioned along the (1,1,1) are commonly used on optical benches, but other component types and other crystal plane positions are within the spirit and scope of the invention.

The optical lens may deflect incident radiation by any amount desired. An illustrative example of a range of deflection is about 8° to about 12° which would include a deflection useful to compensate for an undesirable focal point location caused by the position of a mirror etched into silicon along the (1,1,1) plane. In a further embodiment the range of deflection is about 9° to about 10°.

Further included is a method of compensation for a focal point location caused by a variance between an integral component position on a bench and a desired position wherein the integral component position is determined by the bench crystal structure. The method comprises providing an optical lens and transmitting radiation through the lens to impinge upon the integral component. The lens being of a configuration as described herein that would deflect and focus incident radiation as desired. The integral component is preferably a mirror. In an illustrative example the mirror is formed in a silicon bench by etching an indentation along the (1,1,1) plane and coating the indentation at least partially with a reflective material. Gold and aluminum are exemplary coating materials, however, any reflective material compatible with the assembly structure and function may be used.

Further disclosed is an optical bench comprising an optical lens according to lens characteristics, positioning and functioning described herein. A method of fabricating an optical bench is also disclosed. The bench is fabricated by providing a substrate and providing an integral component positioned on the substrate according to the substrate's crystal structure. "Providing an integral component" includes forming it and/or positioning it. A lens is provided to deflect incident radiation to compensate for an undesirable focal point location caused by a variance between the integral component position on the substrate and a desired position.

Still further disclosed is a semiconductor device comprising an optical lens according to lenses described herein.

While the invention has been described by illustrative embodiments, additional advantages and modifications will occur to those skilled in the art. Therefore, the invention in its broader aspects is not limited to specific details shown and described herein. Modifications, for example, to the type of lens, bench material and integral component type, may be made without departing from the spirit and scope of the invention. Accordingly, it is intended that the invention not be limited to the specific illustrative embodiments but be interpreted within the full spirit and scope of the appended claims and their equivalents.

What is claimed is:

1. An optical device, comprising:

an optical bench;

an optical component integral to said optical bench, wherein a position of said integral optical component is determined by a crystal structure of said optical bench; and a diffractive element optically aligned with said integral optical component, the diffractive element providing an angular offset to incident radiation, the offset substantially compensating for a focal point location caused by a variance between said integral optical component position on said optical bench and a desired position.

2. The optical device of claim 1 wherein the diffractive element is aspheric.

3. The optical device of claim 1 wherein the optical bench comprises a semiconductor material.

4. The optical device of claim 3 wherein the optical bench comprises silicon.

5. The optical device of claim 4 wherein the integral optical component is a positioned along the (1,1,1) silicon plane.

6. The optical device of claim 4 wherein the incident radiation is deflected by an amount in the range of about 8° to about 12°.

7. The optical device of claim 6 wherein the incident radiation is deflected by an amount in the range of about 9° to about 10°.

8. A method of compensation for a focal point location, the method comprising:

providing an optical bench;

positioning an integral component on a bench, wherein said positioning is determined by a crystal structure of said optical bench;

providing an optical lens in optical alignment with said integral component, wherein the optical lens comprises a diffractive element that provides an offset to an angle of incident radiation, the offset substantially compensating for a variance between said integral component position and a desired position; and transmitting radiation through the optical lens to impinge upon the integral component.

9. The compensation method of claim 8 wherein the diffractive element is aspheric.

10. The compensation method of claim 8 wherein the bench comprises a semiconductor material.

11. The compensation method of claim 10 wherein the bench comprises silicon.

12. The compensation method of claim 11 wherein said positioning includes positioning the integral component along the (1,1,1) silicon plane.

13. The compensation method of claim 8 wherein the integral component is a mirror.

14. The compensation method of claim 11 wherein the incident radiation is deflected by an offset amount in the range of about 8° to about 12°.

15. The compensation method of claim 14 wherein the incident radiation is deflected by an offset amount in the range of about 9° to about 10°.

16. A method of fabricating an optical bench comprising:

providing a substrate;

forming an integral component on the substrate according to the substrate's crystal structure; and providing a lens to deflect radiation incident thereto to compensate for a focal point location caused by a variance between the integral component position on the substrate and a desired position.

17. The method of fabricating an optical bench as recited in claim 16 wherein said forming includes forming a mirror.

18. The method of fabricating an optical bench as recited in claim 16 wherein said forming includes:

etching an indentation in said substrate along the (1,1,1) plane, wherein said substrate includes silicon; and coating said indentation at least partially with a reflective material.

* * * * *